UNITED STATES PATENT OFFICE.

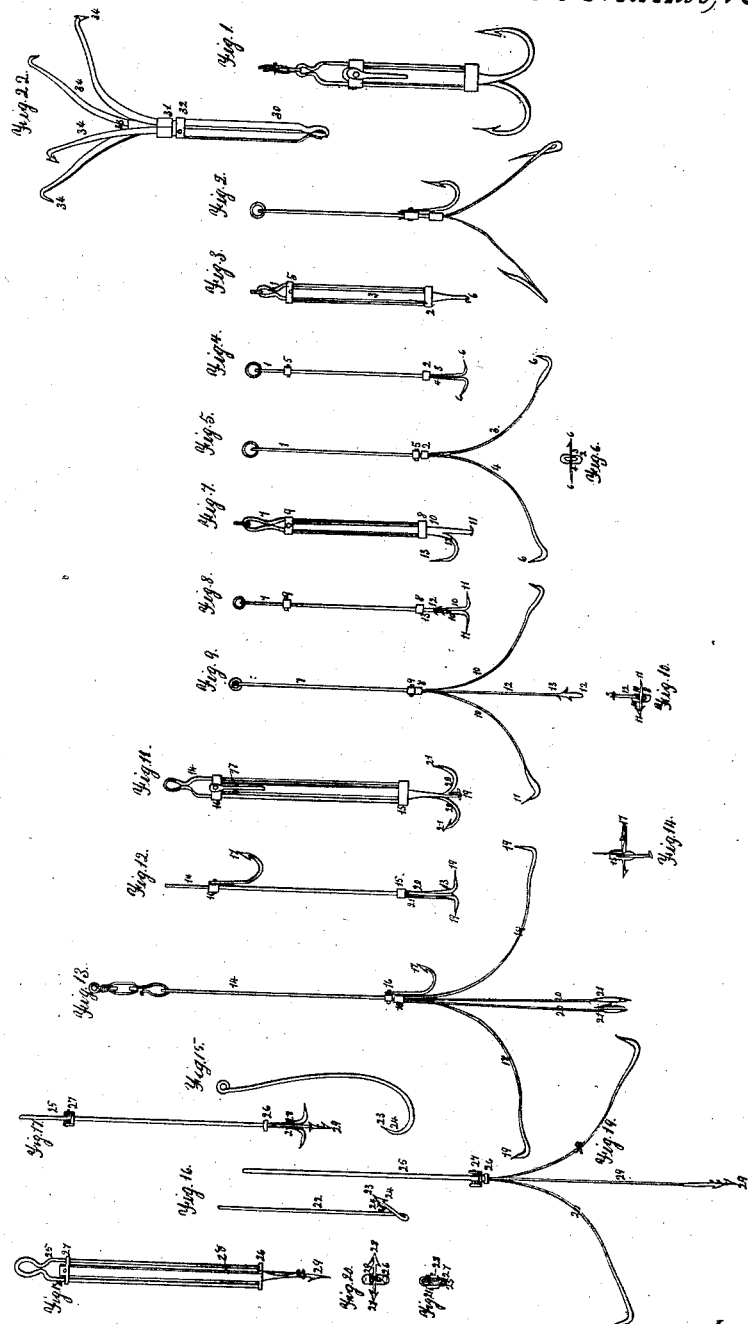

JOB JOHNSON, OF BROOKLYN, NEW YORK.

IMPROVED SPRING SNAP-HOOK.

Specification forming part of Letters Patent No. 6,207, dated March 20, 1849.

*To all whom it may concern:*

Be it known that I, JOB JOHNSON, of the city of Brooklyn, Kings county, and State of New York, fish-hook manufacturer, have invented and made and applied to use certain new and useful improvements in the construction of that class of fish-hooks usually known as "double spring-hooks," which improvements I term "The American Spring Snap-Hook," such improvements consisting in a wire bent so as to form the connection to the line in the bight or middle, with a fixed head connecting the two ends, a sliding head on and between the two wires, carrying two spring-stings, with or without one or more hooks set on the head, (between the spring-stings and sliding through the fixed head,) for which improvements I seek Letters Patent of the United States, and that the said improvements and the mode of constructing and using the same are fully and substantially set forth and shown in the following description, and in the drawings annexed to and making part of this specification, wherein—

Figures 1 and 2 represent the common double spring-hook, introduced herein for the purpose of contrast with the improvements I have made on the same. The other figures represent my improvements. The same marks of reference apply to the same parts in each group of figures, showing the different forms and variations of the same principles of construction. Fig. 3 is a front elevation, Fig. 4 a side elevation shut up ready for use, Fig. 5 a side elevation with the stings expanded, and Fig. 6 a plan, of my improved double sting-hook.

In these, 1 is a wire bent in the middle to form a loop to attach the line or wire to. The two ends coming near each other have on their ends a head-piece, 2, riveted or brazed together. The wire 1 carries on its two parallel ends a sliding head, 5, taking, by a rivet, two springs, 3 4, passing through the head 2. The outer end of each is formed as a point, 6, each one bending outward from the other, and may have one or more barbs.

The operation of this is as follows: The bait being put on the points 6 6, when in the situation shown in Figs. 3 and 4, the fish, taking the bait in his mouth, pulls, and the springs 3 and 4 slide out and assume the position shown in Fig. 5, opening the mouth of the fish and firmly holding in each side of his lips, the elastic power of the spring accommodating itself to the motion of the fish's mouth and jaws, and permanently holding him until secured, when, by drawing the head 5 toward the connection to the line the points are again secured in the position shown in Figs. 3 and 4, and disengaged from the fish.

Figs. 7, 8, 9, and 10 show a similarly-formed hook to the last described, with the addition of a barbed fish-hook between the two stings. In these, Fig. 7 is a front elevation; Fig. 8, a side elevation of a hook ready for use; Fig. 9, a side elevation with the parts expanded, and Fig. 10 a plan.

In these, 7 is the wire, forming the connection to the line carrying the fixed head 8 and sliding head 9, carrying two stings, 10 10, with points 11 11, all similarly constructed to the parts in Figs. 3, 4, 5, and 6, but with the additional straight spring 12 between the two springs 10 10, with a hook, 13, on the end, with any convenient number of barbs.

The operations of the first parts of this hook are similar to the first described, but the center hook, protruding into the mouth and throat of the fish when expanded, as shown in Fig. 9, will take hold of the gills or throat, or any part nearest to it, and effectually prevent the escape of the fish except by tearing out the parts stricken into by the points 11, 11, and 13.

Figs. 11, 12, 13, and 14 show a similar construction of hook with two direct hooks and two stings. In these, Fig. 11 is a front elevation; Fig. 12, a side elevation as ready for use; Fig. 13, a side elevation with the hooks expanded, and Fig. 14 a plan.

14 is a wire bent to form a loop, to which is attached a swivel, which is equally useful in all the other variations. This wire 14 carries a fixed head, 15, and sliding head 16, with two springs, 18 18, with points 19 19, all formed as before described; but the pin carrying the springs 18 18 also carries a bait-hook, 17, and also two straight springs, 20 20, with hooks 21 21, which, taking the gills and inside of the mouth, serve to hold the fish more permanently, and the hook 17 serves the purpose of holding the bait more securely in place.

Three or more hooks may be placed between the springs 18 18.

Figs. 17, 18, 19, 20, and 21 show a hook with two stings and one barbed lance-point. Fig. 17 is a front elevation; Fig. 18, a side elevation as ready for use. Fig. 19 is a side elevation with the hooks expanded. Fig. 20 is a general plan. Fig. 21 is a plan of the sliding head.

In these, 25 is the wire forming the frame. 26 is the fixed head, made by cutting out a plate and riveting the ends of 26 into the ends, with a square hole in the middle, taking the two stings 28, going to a sliding head, 27, shown in Fig. 21, with flanges, taking a rivet to hold the ends of the springs 28 28, and also a straight spring, 29, with a straight lance-point with any number of barbs; or two or more lances may be used between the springs 28 28.

The operation of this is similar to that before described, except that the barbed lance going forward as the spring-stings curve round buries the barbs in the flesh within its reach and beyond the striking-points of the stings.

The heads 26 and 27 may be used with any of the other arrangements before described, or the heads 2 and 5 may be used in this case, although I prefer the head 26.

Fig. 22 shows a four-sting hook expanded. In this, 30 is a strip of metal bent in the middle to form a loop and take the line, the two ends brazed with a square collar-head, 31, and having a square sliding head, 32, carrying four springs, 34 34, two of which are attached to a pyramidal frustum, 33, the two others by a pin through them and the collar 32 and frustum 33. These springs have points with or without barbs.

The operation in this case is, that as the fish draws the hooks out by biting on the bait the hooks expand and strike into the flesh of his mouth and hold the fish firmly until withdrawn by pulling the head 32 back and drawing the points together; and it will appear evident that three or more springs and points can be used in the same manner.

Figs. 15 and 16 show my improved manner of constructing barbs for the foregoing or any other fish-hook. In these, 22 is the shank; 23, the point, with 24 24 24, three barbs, formed by cutting each from the sides of the point, by which means a barb is formed of a large size with very little decrease of strength in the material, and by forming the barbs on the sides or back of the point the barb itself stands out farther from the body, as it is not closed partially up by the operation of bending the point of the hook into a curved form, and any number of barbs can be so cut from the side without materially lessening the strength of the hook, as the barbs are to be constructed each one on one side farther from the point than the one on the opposite side, and alternating with each other down from the point toward the shank, so that no two barbs come directly opposite to each other.

The differences between the improved spring-hook herein described and the common spring-hook shown in Figs. 1 and 2 are as follows: In Fig. 1 the width between the points of the hooks, when closed up, is so great as to interfere with the fish taking both hooks into his mouth, so that the bait is often removed by the fish; and if the fish does get both hooks into his mouth, as they expand, as shown in Fig. 2, the springs curving, set the points of the hooks toward each other, so that the curve of the lower part of the hook takes the inside of the mouth, and standing outside of the vertical line of the points of the hooks, tears them out, so that the farther the springs slide out the more they tend to liberate the fish; while with my improved arrangement of stings alone, or of stings and hooks or lances combined, the more the stricken fish attempts to escape the firmer it holds him, and the differences in the vertical angle of the points when closed or open help the more to hold the fish on the points.

Having thus described the construction and operation of my improved barbs and spring snap-hook, I do not claim to have invented the hook shown in Figs. 1 and 2, as that is well known; but

What I do claim as new and of my own invention, and desire to secure by Letters Patent of the United States, is as follows:

The sliding springs 3 and 4, Figs. 3, 4, 5, and 6, with points turning outward, with or without barbs, in combination with the single spring 12 and hook 13, (shown in Figs. 7, 8, 9, and 10,) or the double spring 18 18, with hooks 19 19, in Figs. 11, 12, 13, and 14, or with the barbed lance shown in Figs. 17, 18, 19, and 20.

In witness whereof I have hereunto affixed my signature this 17th day of November, 1847.

JOB JOHNSON.

Witnesses:
 EDW. W. SERRELL,
 LEMUEL W. SERRELL.